Sept. 17, 1940.　　　　　D. HEYER　　　　　2,214,854
VARIABLE SPEED TRANSMISSION DEVICE
Filed May 13, 1930　　　2 Sheets-Sheet 1
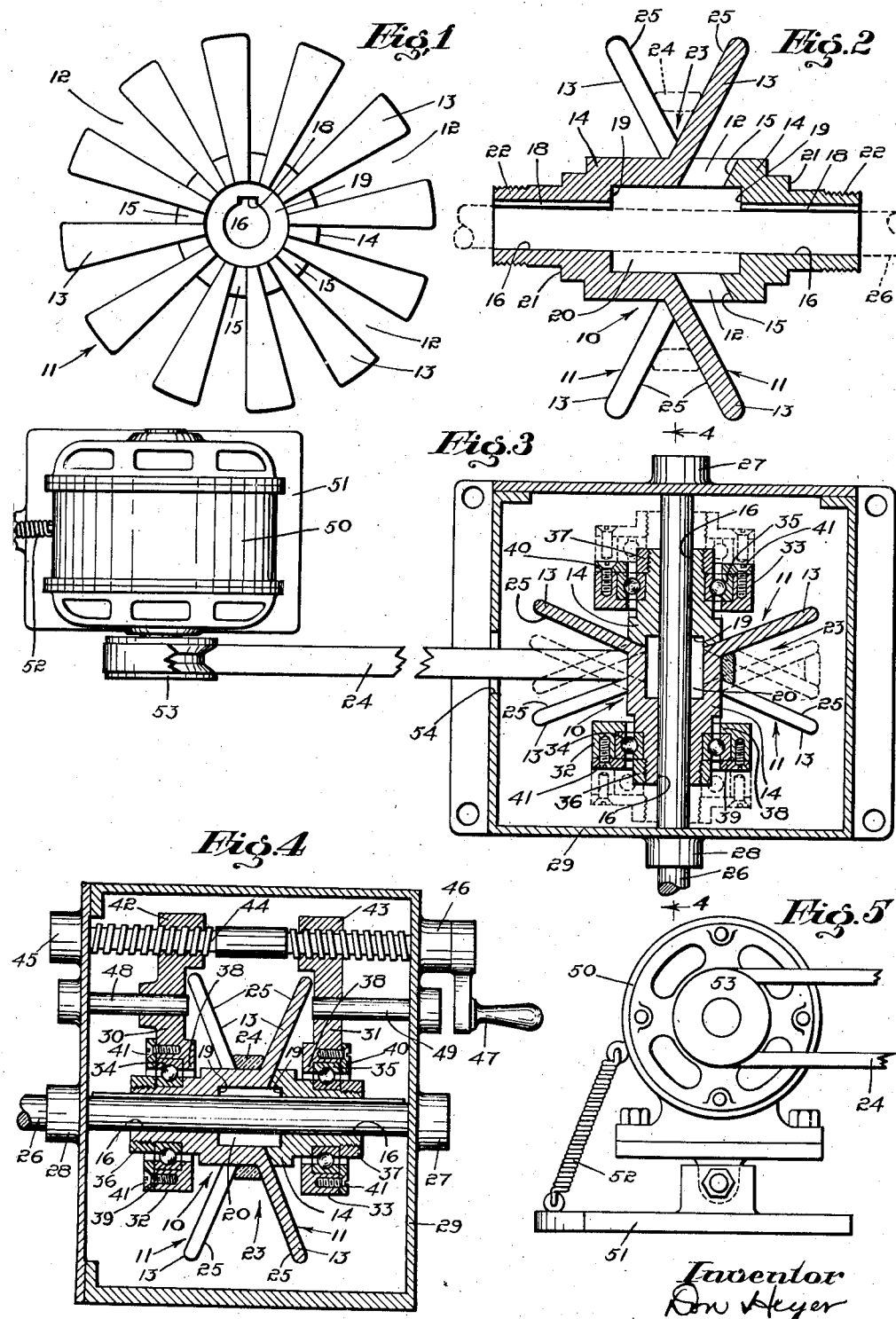
Inventor
Don Heyer Sept. 17, 1940.  D. HEYER  2,214,854
VARIABLE SPEED TRANSMISSION DEVICE
Filed May 13, 1930  2 Sheets-Sheet 2
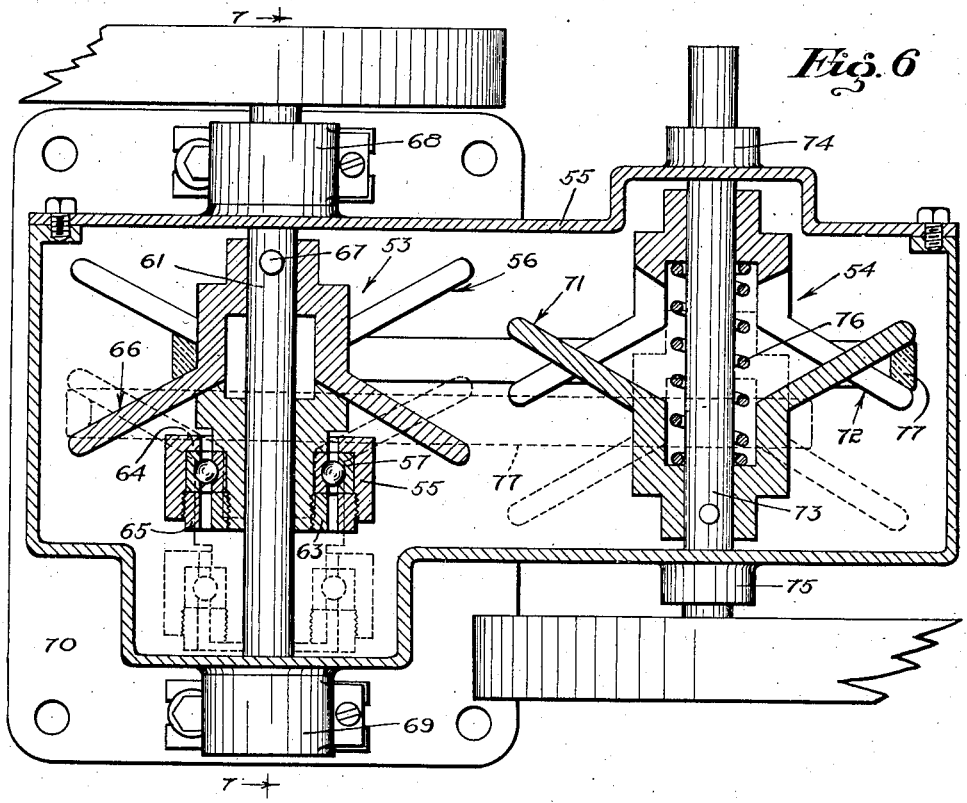
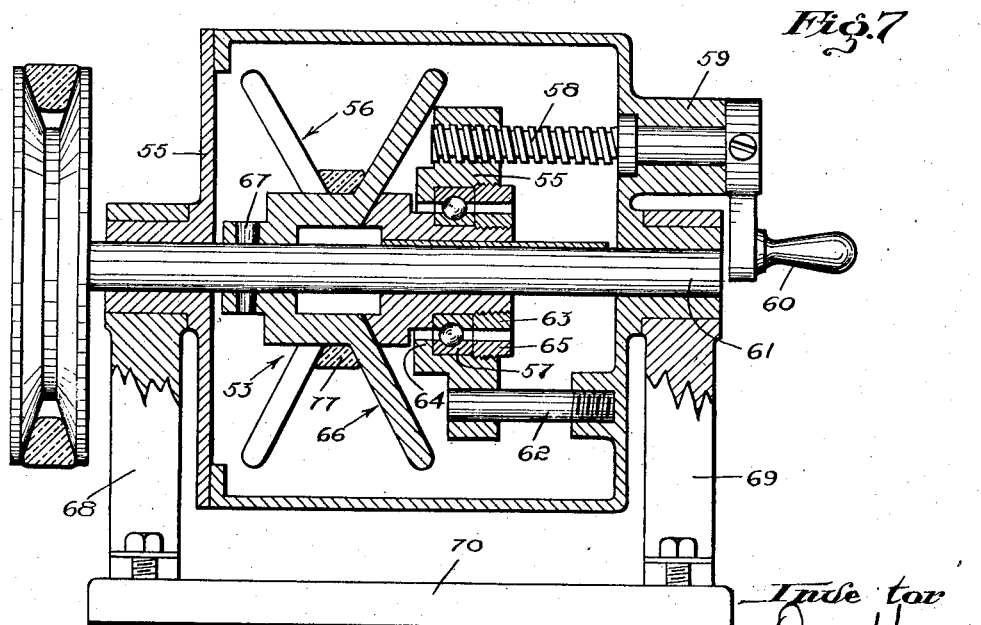

Patented Sept. 17, 1940

2,214,854

UNITED STATES PATENT OFFICE 2,214,854

VARIABLE SPEED TRANSMISSION DEVICE

Don Heyer, Los Angeles, Calif., assignor to U. S. Electrical Motors, Inc., a corporation of California Application May 13, 1930, Serial No. 452,108

2 Claims. (Cl. 74—230.17)

My invention relates to transmission devices and more particularly to variable speed transmission devices which include one or more transmission elements of variable effective diameter.

Subject matter disclosed herein, but not claimed, is claimed in my copending applications Serial No. 692,851 filed on October 9, 1933, for Variable speed power unit, and Serial No. 34,049 filed on July 31, 1935, for Variable speed transmission device; which are a continuation in part of this application.

An object of this invention is the provision of a variable speed transmission mechanism capable of effecting numerous speed changes without interrupting the operation of the driven means.

An object of this invention is to provide a variable transmission mechanism of such arrangement that a maximum number of speed changes may be atteained.

A further object of this invention is to provide a device of this character which may be used alone and in multiples to provide a variable speed transmission medium between the source of power and the driven means.

Another object of the present invention is to provide a simple, effective and economical construction of a variable speed transmission mechanism.

A still further object of this invention is to provide a device of this character which shall consist of a minimum number of parts all capable of being quickly and easily assembled together into the completed structure.

My invention possesses many other advantages and has other objects which may be made more easily apparent from a consideration of one embodiment of my invention. For this purpose I have shown one form in the drawings accompanying and forming part of the present specification. I shall now proceed to describe this form in detail, which illustrates the general principles of my invention; but it is to be understood that this description is not to be taken in a limiting sense, since the scope of my invention is best defined by the appended claims.

Reference is had to the accompanying drawings in which:

Figure 1 is an end view of one of the spider-like sections incorporated in my invention;

Figure 2 is a longitudinal sectional view taken through my variable speed transmission device and showing the spider-like sections in an intermediate engagement;

Figure 3 is a plan view showing one application of my variable transmission device, certain portions being shown in section to clearly illustrate the same;

Figure 4 is a vertical sectional view taken as indicated by line 4—4 in Figure 3;

Figure 5 is a side elevation clearly illustrating one method of arranging an electric motor or other suitable driving means whereby any slackness in a belt or other flexible element may be readily compensated for;

Figure 6 is a sectional view illustrating a further application of my improved variable transmission device;

Figure 7 is a vertical sectional view taken as indicated by line 7—7 in Figure 6.

Referring more in detail to especially Figures 1 and 2 of the drawings, the numeral 10 designates generally my novel transmission device capable of variable effective diameters, and for convenience in referring to the same throughout the description may be termed a "variable unit." The variable unit 10 comprises two spider-like sections 11, each consisting of a plurality of apertures 12 and fingers 13 alternately arranged about a hub portion 14. The fingers 13 defined by the apertures 12 extend axially of the hub portion for a suitable distance and then extend outwardly and angularly of said hub. The apertures 12 terminate at 15 to define shoulders or stops. An opening 16 may be provided in the hub portions to receive a shaft, shown in dotted lines in Figure 2 of the drawings, and a keyway 18 may be provided therein for slidably splining the spider-like sections 11 to the shaft. The spider-like sections are of such construction that shoulders 19 are provided in the hub portions thereof and a space 20 between the shaft and the portions of the fingers 13 extending axially of the hub may conveniently accommodate a spring when my device is used in certain combinations. One application of my invention utilizing the spring is clearly illustrated in Figures 6 and 7 of the drawings and hereinafter described, but it should be clearly understood that I do not wish to limit myself to the necessity of a spring member between the spider-like sections because in many instances one of which is shown in Figures 1 to 5 inclusively of the drawings such an arrangement would be unnecessary and impractical. Although the space 20 is shown in Figures 2, 3 and 4 it is unnecessary and could be omitted therefrom. The hub portions 14 may be shouldered at 21 and provided at their ends with threaded portions 22.

When the spider-like sections 11 comprising the angularly arranged fingers defined by the apertures 12 are interlaced, as clearly shown in Figures 2, 3 and 4 of the drawings, a V-shaped seat 23 is defined to accommodate a suitable flexible element 24.

In the drawings I have shown a V-belt as the flexible element but I do not wish to limit myself to the use of such a device inasmuch as I find other driving elements equally as satisfactory as the one shown and described.

The diameter of the flexible element seat may be easily varied by longitudinally adjusting the spider-like sections on the shaft to raise and lower said V-shaped seat and define an active diameter therefore. The surfaces 25 of the fingers may be smooth to facilitate in prolonging the life of the flexible element which slides thereon when the diameter of the seat is varied. Figure 2 clearly shows the variable unit in an intermediate position, that is, in a position where the interlacing of the spider-like sections 11 define a mean diameter for the flexible element 24. When the fingers 11 are in abutment with the stops 15, the smallest attainable diameter is secured and as the spider-like sections 11 are moved apart, the active diameter of the variable unit is increased until a maximum diameter is attained, said diameter being governed by the length of the angular fingers 13.

One application of my invention is clearly illustrated in Figures 3, 4 and 5 of the drawings wherein one variable unit only may be conveniently used as a variable speed transmission medium between the driving means and the driven mechanism. The interlaced spider-like sections 11 may be slidably splined on the shaft 26 as clearly shown in Figure 4, the ends of said shaft being journaled in suitable bearings 27 and 28 of the housing 29. I have shown that end of the shaft 26 engaging with the bearing 28 as projecting through the bearing and extending a distance beyond the same to receive a pulley or the like (not shown in the drawings), whereby power may be transmitted from my device to any desired mechanism.

The means for axially moving the spider-like sections 11 on the shaft 26 may comprise two arms 30 and 31 provided on their lower ends with supporting collars 32 and 33 to engage with suitable bearings 34 and 35 respectively, securely held on the hub portions 14 and in abutment with the shoulders 21 in any suitable manner as by nuts 36 and 37 screwed onto the threaded portions 22 of the hub members. The supporting collars 32 and 33 may be secured to the bearings 34 and 35 through a flange 38 on said collars, and plates 39 and 40 secured to the collars in any convenient manner as by screws 41. The uppermost ends of the arms 30 and 31 may be provided with bosses 42 and 43 internally threaded to receive a screw 44 journaled in suitable bearings 45 and 46 of the housing 29. One end of the screw 44 may be provided with right hand threads and the other end with left hand threads. In Figure 4 I have shown the portion of the screw 44 engaging with the boss 43 as having right hand threads and the portion engaging with the boss 42 as having left hand threads. A crank 47 secured to one end of the screw 44 may serve to actuate the device. Suitable guide pins 48 and 49 secured to the housing intermediate of the screw 44 and the shaft 26 may provide an additional means for supporting the arms 30 and 31.

Any suitable means may be provided for driving my device but for convenience in illustrating, I have shown an electric motor 50 as the driving means. I prefer to pivotally mount the motor on a base 51. Any suitable flexible element 24 may be employed to engage with a pulley 53 on the motor and pass through the aperture 54 in the housing 29 to engage with and drive the variable unit 10.

To operate the variable unit, that is, to attain various speeds of the shaft 26, the active diameter of the variable unit must necessarily be varied. This may be accomplished by turning the crank 47 in one direction or the other to axially move the spider-like sections toward and from each other to vertically vary the diameter of the flexible element seat. In Figures 3 and 4 of the drawings I have shown the spider-like sections 11 comprising the variable unit 10, as defining a seat of minimum diameter for the flexible element. To decrease the speed of the shaft 26, the spider-like sections 11 comprising the variable unit may be made to move outwardly from each other in the manner heretofor described. When the spider-like sections are moved in this manner the flexible element engaging with the V-shaped seat is forced outwardly to any desired diameter, depending upon the axial movement of said spider-like sections. When the active diameter of the variable unit is increased, a greater belt length is necessary and consequently the pivotally arranged motor is pulled forward throwing the spring 52 under tension. In Figure 3 of the drawings I have shown in dotted lines the spider-like sections in a maximum position, that is, in a position where the diameter of the flexible element seat is the largest. At this point the tension of the spring 52 is the greatest. To increase the speed of the shaft 26 the spider-like members may be moved inwardly whereby the diameter of the flexible element seat is diminished and the flexible element tends to become slack, but the tension of the spring 52 compensates for such slackness directly as it appears, and consequently a tight belt is maintained at all times.

From the foregoing description it should be clear that my device provides a means whereby continuous speed changes may be maintained without interrupting the operation of the driven mechanism.

Figures 6 and 7 of the drawings illustrate a further embodiment of my invention in which I prefer to arrange two variable units 53 and 54 in a compact housing 55, said units being adapted to operate conjunctively to provide a variable speed medium between a driving means and a driven mechanism. The variable units 53 and 54 are generally, of similar construction to the one heretofore described, in that two interlacing spider-like sections comprise each of said units. The variable unit 53 may be manually actuated to attain variable effective diameters, while the variable unit 54 might be termed an "idler" unit, being adapted to automatically attain variable effective diameters which are directly proportional to those on the variable unit 53, when a flexible element such as a V-belt or the like is in engagement with the two units and my device is in operation.

The means for actuating the variable unit 53 may comprise a collar 55 engaging with the hub portion of the spider-like section 56 through a bearing 57 to receive in its uppermost portion a screw 58 one end of which may be journaled in a bearing 59 and extend therethrough to receive any suitable actuating member as a crank 60. The spider-like section 56 may be slidably splined to a shaft 61 as clearly shown in Figure 7 of the drawings. The lower portion of the collar 55 may be adapted to slidably receive a supporting pin 62. The bearing 57 may be held in engagement with the hub portion by means of a nut 63 while a flange 64 on the collar 55 and a nut 65 provides suitable means for securing said collar to the bearing. The spider-like section 66 may be securely fastened to the shaft 61 in any suitable manner as by a taper pin 67. The ends of the shaft may be journaled in suitable bearings on the housing and one end of the shaft may be adapted to receive a pulley or the like to provide a means for driving any desired mechanism. I prefer to pivotally support the complete housing by means of pedestals 68 and 69 mounted on to a base 70 as clearly shown in Figure 7 of the drawings.

The variable unit 54 which I have heretofore termed the "idler" unit comprises two interlacing spider-like sections 71 and 72 mounted on a shaft 73 the ends of which may be journaled in bearings 74 and 75. A pulley or the like may engage with one end of the shaft 73 whereby power may be transmitted to my device from any suitable source. The spider 71 may be secured to the shaft by a taper pin or the like while the spider 72 may be allowed to float thereon. A spring 76 may yieldingly engage with the two spider-like sections as shown in Figure 6. A flexible element 77 such as a V-belt or the like may serve to engage with the variable units 53 and 54.

In Figure 6 of the drawings I have shown the variable unit 53 in a position where the diameter of the belt seat is at a minimum while that of the variable unit 54 is at a maximum. The dotted lines in this same view indicate the exact reversal of the foregoing condition, that is, the diameter of the variable unit 53 is at a maximum and that of the unit 54 at a minimum. It should be particularly noted that the belt remains constantly in line as various speed changes are maintained.

When my transmission device is in operation and it is desired to vary the speed of the driven mechanism, my device may be actuated in the following manner. By turning of the crank 60, the spider-like section 56 may be moved outwardly to angularly raise the belt in the V-shaped seat, the diameter of which becomes increased as the spider 56 is moved outwardly. As the diameter of the belt seat is increased on the variable unit 53 it may be readily seen that the spider-like section 72 is forced inwardly by the belt to define a smaller seat diameter and throw the spring 76 under compression. A constant series of speed changes may be accomplished in the foregoing manner until a position indicated by dotted lines in Figure 6 is reached. When the crank is turned in the opposite direction and the spider-like section 56 is moved inwardly the diameter of the belt seat is decreased and the tension spring proceeds to force the spider-like section 72 outwardly to increase the diameter of the belt seat and compensate for the slackness appearing in the flexible element.

I claim:

1. In an adjustable speed drive, a driving pulley structure, a driven pulley structure, a belt for transmitting power between the pulley structures, one of said pulley structures having an adjustable effective diameter and including a pair of pulley sections with opposed inclined belt engaging faces, forming by relative axial adjustment variable effective pulley diameters, means for adjusting the effective diameter of said adjustable pulley structure, an electric motor having a shaft in coaxial driving relation to said driving pulley structure, a supporting means, means for movably mounting said electric motor and said driving pulley structure on said supporting means to render it possible to vary the center distance between the axes of the pulley structures, and resilient means urging said electric motor and driving pulley structure with respect to said supporting means constantly in a direction to increase said center distance irrespective of relative pulley diameters, said resilient means producing a force that acts directly on said movably mounting means.

2. In combination: an adjustable base member; an electric motor on said base member including a drive shaft; a driven shaft operatively aligned with said drive shaft; a pulley on said drive shaft and a pulley on said driven shaft, one of said pulleys being of the adjustable V-type having a pair of flange members, one of said flange members being movable toward and away from the other to adjust the effective diameter of said pulley; adjustment means mechanically interconnecting said flange members for changing the position therebetween and holding said flange members in fixed relative position when said adjustment means is not being moved; belt means operatively connecting said pulleys; and resilient means operatively connected to said adjustable base member and cooperating with said belt means in controlling the position of said motor as said adjustment means is operated whereby movement of said adjustment means changes the distance between said shaft of said motor and said driven pulley.

DON HEYER.